(12) United States Patent
Chiga et al.

(10) Patent No.: US 10,998,581 B2
(45) Date of Patent: May 4, 2021

(54) NONAQUEOUS ELECTROLYTE SECONDARY BATTERIES

(71) Applicant: PANASONIC CORPORATION, Osaka (JP)

(72) Inventors: Takanobu Chiga, Osaka (JP); Naoya Morisawa, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/377,071

(22) Filed: Apr. 5, 2019

(65) Prior Publication Data

US 2019/0237798 A1    Aug. 1, 2019

Related U.S. Application Data

(62) Division of application No. 15/216,919, filed on Jul. 22, 2016, now Pat. No. 10,297,858.

(30) Foreign Application Priority Data

Sep. 30, 2015 (JP) .................................. 2015-193889

(51) Int. Cl.
*H01M 10/0567* (2010.01)
*H01M 2/02* (2006.01)
(Continued)

(52) U.S. Cl.
CPC ..... *H01M 10/0567* (2013.01); *H01M 2/0285* (2013.01); *H01M 2/0287* (2013.01);
(Continued)

(58) Field of Classification Search
CPC ......... H01M 10/0567; H01M 10/0568; H01M 10/0569; H01M 10/0525; H01M 10/052;
(Continued)

(56) References Cited

U.S. PATENT DOCUMENTS

| | | |
|---|---|---|
| 2010/0081062 A1 | 4/2010 | Chiga et al. |
| 2012/0309881 A1 | 12/2012 | Tokuda et al. |
| 2016/0233513 A1 | 8/2016 | Abe et al. |

FOREIGN PATENT DOCUMENTS

| | | |
|---|---|---|
| CN | 101617432 A | 12/2009 |
| CN | 102754268 A | 10/2012 |
| JP | 2009-289414 A | 12/2009 |

OTHER PUBLICATIONS

K. A. Smith et al., "Electrolytes Containing Fluorinated Ester Co-Solvents for Low-Temperature Li-Ion Cells" ECS Transactions, 11 (29) pp. 91-98, 2008.
(Continued)

*Primary Examiner* — Laura Weiner
(74) *Attorney, Agent, or Firm* — McDermott Will & Emery LLP

(57) ABSTRACT

A nonaqueous electrolyte secondary battery including an electrode assembly in which a positive electrode and a negative electrode are stacked together through a separator, a nonaqueous electrolytic solution, and an exterior case which accommodates the electrode assembly and the non-aqueous electrolytic solution. The negative electrode is electrically connected to the exterior case, which contains iron, and the nonaqueous electrolytic solution includes a fluorinated carboxylate ester and lithium fluorosulfate salt ($LiSO_3F$).

9 Claims, 3 Drawing Sheets

(51) Int. Cl.
*H01M 2/22* (2006.01)
*H01M 4/525* (2010.01)
*H01M 10/04* (2006.01)
*H01M 10/052* (2010.01)
*H01M 10/0525* (2010.01)
*H01M 10/056* (2010.01)
*H01M 10/0568* (2010.01)
*H01M 10/0569* (2010.01)
*H01M 2/26* (2006.01)
*H01M 10/0587* (2010.01)

(52) U.S. Cl.
CPC ............ *H01M 2/22* (2013.01); *H01M 4/525* (2013.01); *H01M 10/0422* (2013.01); *H01M 10/052* (2013.01); *H01M 10/056* (2013.01); *H01M 10/0525* (2013.01); *H01M 10/0568* (2013.01); *H01M 10/0569* (2013.01); *H01M 2/027* (2013.01); *H01M 2/263* (2013.01); *H01M 10/0587* (2013.01); *H01M 2300/004* (2013.01); *H01M 2300/0034* (2013.01); *H01M 2300/0042* (2013.01)

(58) Field of Classification Search
CPC ........... H01M 10/056; H01M 10/0422; H01M 10/0587; H01M 4/525; H01M 2/22; H01M 2/0287; H01M 2/0285; H01M 2/263; H01M 2/027; H01M 2300/0042; H01M 2300/004; H01M 2300/0034; H01M 2300/0025
See application file for complete search history.

(56) References Cited

OTHER PUBLICATIONS

Non-Final Office Action issued in U.S. Appl. No. 15/216,919, dated Aug. 31, 2018.
Notice of Allowance issued in U.S. Appl. No. 15/216,919, dated Feb. 11, 2019.
English Translation of Chinese Search Report dated Jul. 30, 2020 issued in related Chinese Patent Application No. 201510634391.1.

NONAQUEOUS ELECTROLYTE SECONDARY BATTERIES

RELATED APPLICATIONS

This application is a divisional of U.S. patent application Ser. No. 15/216,919, now U.S. Pat. No. 10,297,858, filed Jul. 22, 2016, which claims the benefit of Japanese Application No. 2015-193889, filed on Sep. 30, 2015, the disclosures of which are incorporated in their entirety by reference herein.

BACKGROUND

1. Technical Field

The present disclosure relates to nonaqueous electrolytic solutions for nonaqueous electrolyte secondary batteries and to nonaqueous electrolyte secondary batteries.

2. Description of the Related Art

A nonaqueous electrolytic solution used in nonaqueous electrolyte secondary batteries includes a nonaqueous solvent and an electrolyte salt. Non-Patent Literature 1 (ECS Transactions, 11 (29) 91-98 (2008), Electrolytes Containing Fluorinated Ester Co-Solvents for Low-Temperature Li-Ion Cells) discloses that the use of a nonaqueous solvent which includes a fluorinated carboxylate ester provides good low-temperature discharge characteristics. Further, Patent Literature 1 (Japanese Patent No. 5235437) discloses that high-temperature storage characteristics are improved by using a nonaqueous solvent which includes a fluorinated carboxylate ester having a hydrogen atom at the α-position.

In the techniques disclosed in Non-Patent Literature 1 and Patent Literature 1, the fluorinated carboxylate ester is decomposed by an alkali component present in the positive electrode during the first charging and the decomposition product is diffused toward the negative electrode to form an excessively thick film. The film inhibits the deintercalation of lithium ions from the negative electrode during discharging to cause a decrease in initial efficiency. In particular, the decrease in initial efficiency is marked in the case of a Ni-rich positive electrode active material because the active material contains a large amount of an alkali component.

SUMMARY

In one general aspect, the techniques disclosed here feature a nonaqueous electrolytic solution for nonaqueous electrolyte secondary batteries including a nonaqueous solvent and an electrolyte, the nonaqueous solvent including a fluorinated carboxylate ester, the nonaqueous electrolytic solution containing lithium fluorosulfate salt ($LiSO_3F$).

The nonaqueous electrolyte secondary battery comprising an electrode assembly in which a positive electrode and a negative electrode are stacked together through a separator, a nonaqueous electrolytic solution, and an exterior case which accommodates the electrode assembly and the nonaqueous electrolytic solution. The negative electrode is electrically connected to the exterior case, which contains iron, and the nonaqueous electrolytic solution includes a fluorinated carboxylate ester and lithium fluorosulfate salt ($LiSO_3F$).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
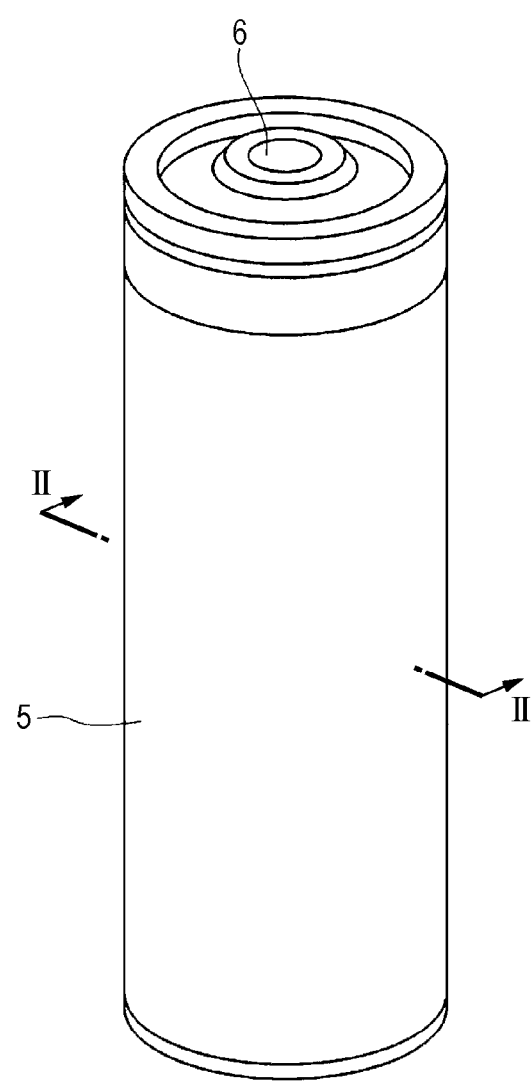
FIG. 1 is a perspective view illustrating the appearance of a nonaqueous electrolyte secondary battery representing an embodiment of the present disclosure.

In a nonaqueous electrolyte secondary battery, the addition of a fluorinated carboxylate ester to a nonaqueous electrolytic solution including a nonaqueous solvent and an electrolyte salt leads to good low-temperature discharge characteristics. Further, the battery achieves an improvement in high-temperature storage characteristics in a charged state when the nonaqueous electrolytic solution contains a fluorinated carboxylate ester having a hydrogen atom at the α-position. It is therefore desirable that the nonaqueous electrolytic solution contain a fluorinated carboxylate ester having an α hydrogen atom in order to allow the battery to attain good low-temperature discharge characteristics and high-temperature storage characteristics.

It is known that in a nonaqueous electrolyte secondary battery, part of the nonaqueous electrolytic solution is decomposed during the first charging and the decomposition product forms a film on the surface of the negative electrode. The surface of the negative electrode refers to the interface contributing to the reaction that is formed between the nonaqueous electrolytic solution and the negative electrode active material, and specifically indicates the surface of the negative electrode active material layer and the surface of the negative electrode active material. Such a film is called an SEI (solid electrolyte interface) film and works in favor of battery characteristics.

If the decomposition product from the nonaqueous electrolytic solution forms an excessively thick film on the surface of the negative electrode, lithium ions that have been intercalated into the negative electrode during the first charging are inhibited from being deintercalated during discharging and consequently the initial efficiency is decreased. The initial efficiency may be represented by the following equation:

Initial efficiency=First discharge capacity/First charge capacity×100

The above decrease in initial efficiency is encountered when the nonaqueous electrolytic solution contains a fluorinated carboxylate ester with an α-hydrogen atom represented by the following general formula (1). In particular, the decrease is marked when a high-Ni positive electrode active material containing a large amount of an alkali component is used. The reason for this is probably because, as shown in the reaction formula (I) below, the fluorinated carboxylate ester is decomposed by the alkali component, for example, lithium carbonate present in the positive electrode active material to generate $H_2O$ and $R_1R_2C$=$CHCOOR_3$, which are then diffused toward the negative electrode to form an excessively thick film on the surface of the negative electrode.

General Formula (1)

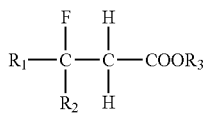

(In the formula, $R_1$ and $R_2$ are each any of H, F, $CH_{3-x}F_x$ (x is 1, 2 or 3) and may be the same as or different from each other, and $R_3$ is an optionally fluorinated alkyl group having 1 to 3 carbon atoms.)

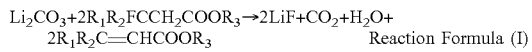

Reaction Formula (I)

The present inventors conducted extensive studies in order to solve the problems discussed above. As a result, the present inventors have found that lithium fluorosulfate salt ($LiSO_3F$) disclosed as being effective for enhancing low-temperature characteristics in Japanese Unexamined Patent Application Publication No. 2011-187440 should be added to a nonaqueous electrolytic solution which contains a fluorinated carboxylate ester having an α hydrogen atom, and have completed a technique that forms a basis of an embodiment of the present disclosure. In such an embodiment, $LiSO_3F$ is adsorbed to the positive electrode so as to suppress the decomposition reaction of the fluorinated carboxylate ester represented by the reaction formula (I). Thus, the addition of $LiSO_3F$ results in an improvement in initial efficiency while still ensuring good low-temperature discharge characteristics and good high-temperature storage characteristics.

Some nonaqueous electrolyte secondary batteries are so configured that an electrode assembly in which positive and negative electrodes are wound or stacked together through a separator, and a nonaqueous electrolytic solution are accommodated in an Fe-based exterior case and the negative electrode is electrically connected to the exterior case. The surface of the exterior case of such a battery is plated with nickel. The present inventors have experienced that when the nonaqueous electrolytic solution of the battery contains a sulfur compound, for example, $LiSO_3F$, the exterior case is corroded during over-discharging at high temperatures. The reasons for this phenomenon are probably as follows. Products resulting from the decomposition of the sulfur compound, for example, $LiSO_3F$, react with nickel as the skin of the exterior case to cause iron to be exposed. In an over-discharging test at high temperatures, the exterior case is subjected to a potential of about 3 V versus lithium, and consequently the exposed iron is dissolved and the case is corroded.

During the studies directed to reaching the embodiment discussed here, the present inventors have found that the corrosion of the exterior case is suppressed by adding a fluorinated carboxylate ester together with $LiSO_3F$ to the nonaqueous electrolytic solution. The fluorinated carboxylate ester added to the nonaqueous electrolytic solution has a hydrogen atom at the a position and is decomposed as illustrated in the reaction formula (II) below to form a film on the inner peripheral wall and the inner bottom of the exterior case. The suppression of the corrosion of the exterior case is probably ascribed to this film serving as a protective layer for the exterior case. Specifically, the protective layer (the protective film) suppresses the reaction between the decomposition products derived from $LiSO_3F$ and nickel as the skin of the exterior case and thereby prevents iron from being exposed. This is probably the reason why the dissolution of iron is prevented and the corrosion of the exterior case is controlled even when an over-discharging test is performed at high temperatures.

Reaction Formula (II)

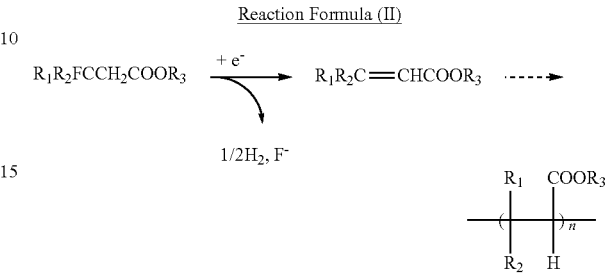

Hereinbelow, an embodiment of the present disclosure will be described in detail with reference to the drawings. The drawings used in the description of the embodiment are schematic, and the constituents illustrated in the drawings are sometimes not to scale. Specific scales such as sizes should be estimated in consideration of the description given below.

Figure 2:
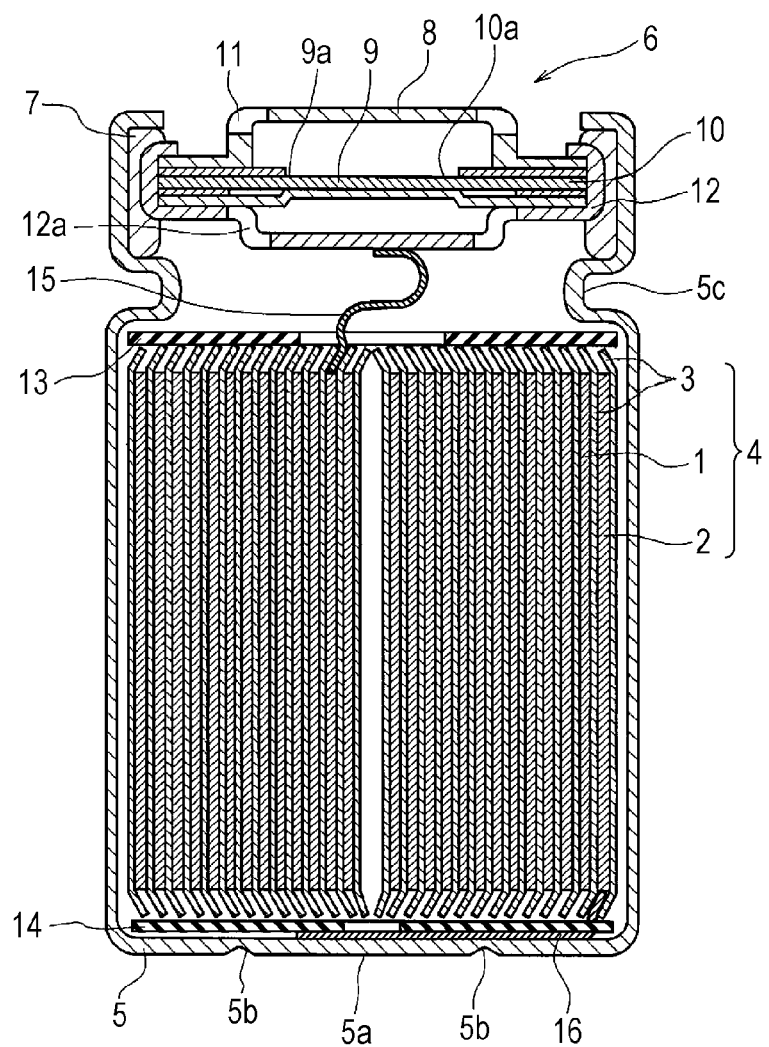
FIG. 2 is a sectional view taken along line II-II in FIG. 1.

FIG. 1 is a perspective view of a nonaqueous electrolyte secondary battery representing an example of the present embodiment. FIG. 2 is a sectional view taken along line II-II in FIG. 1. In the nonaqueous electrolyte secondary battery, as illustrated in FIG. 2, an electrode assembly 4 in which a positive electrode 1 and a negative electrode 2 are wound together through a separator 3, and a nonaqueous electrolytic solution (not shown) are accommodated in a bottomed cylindrical exterior case 5. Near the opening of the cylinder, the exterior case 5 has a circumferential groove 5c that is U-shaped in cross section. A sealing member 6 serves as a lid and is attached so as to tightly close the open end of the exterior case 5 through a gasket 7.

The sealing member 6 includes a sealing plate 8, a valving member 9, an inner cap 10, an evacuation outlet 11 and a filter 12. The sealing plate 8 serves as a positive electrode external terminal. The valving member 9, the inner cap 10 and the evacuation outlet 11 serve as a safety valve through which any gas generated in the battery is discharged to the outside of the battery.

The valving member 9 and the inner cap 10 have a thin portion 9a and a thin portion 10a that are to be broken when the pressure inside the battery reaches a prescribed value. The evacuation outlet 11 is disposed in the sealing plate 8, and any gas that has been generated in the battery and has broken the valving member 9 and the inner cap 10 is discharged to the outside of the battery through the evacuation outlet 11. The filter 12 has an opening 12a for the discharging of the gas.

Insulating plates 13 and 14 are disposed on the sealing member 6 side of the electrode assembly 4 and on the other side near the bottom 5a of the exterior case 5, respectively. The positive electrode 1 is connected to the filter 12 through a positive electrode lead 15, and the negative electrode 2 to the bottom 5a of the exterior case 5 through a negative electrode lead 16.

Figure 3:
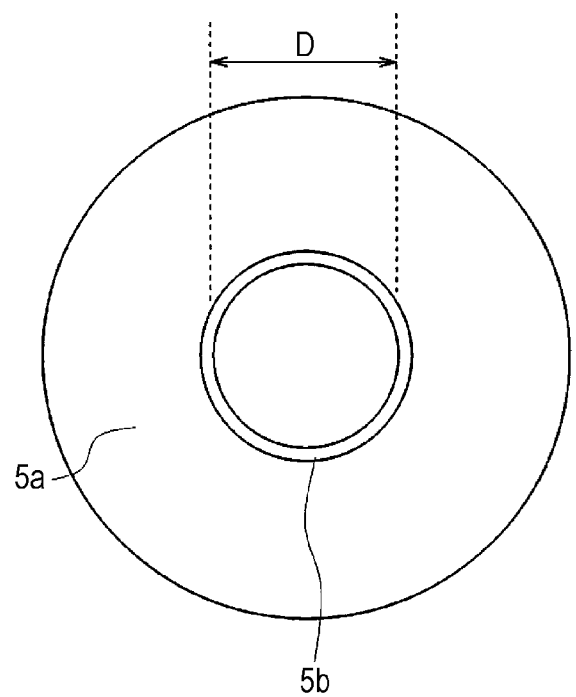
FIG. 3 is a view illustrating the outer bottom of the nonaqueous electrolyte secondary battery in the above embodiment.

FIG. 3 is a view illustrating the outer surface of the bottom 5a of the exterior case 5. Preferably, as illustrated in FIG. 3, the bottom 5a of the exterior case 5 has a ring-shaped thin portion 5b that is to be broken when the pressure inside the battery reaches a prescribed value. The thin portion 5b is formed so that the bottom 5a is recessed from the outer bottom surface toward the inner surface of the bottom. The thin portion 5b is broken upon the prescribed increase in the pressure inside the battery and thereby serves to prevent the breakage of the cylindrical side wall of the exterior case 5. It is preferable that the thin portion 5b be configured to operate at a pressure higher than the pressure which initiates the operation of the thin portion 9a disposed in the valving member 9.

Figure 4:
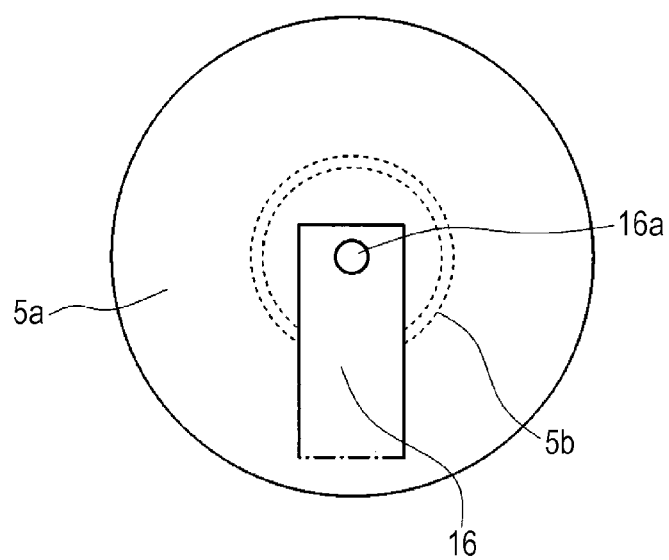
FIG. 4 is a view illustrating the inner bottom of the nonaqueous electrolyte secondary battery in the above embodiment.

FIG. 4 is a view illustrating the inner surface of the bottom 5a of the exterior case 5. When the thin portion 5b is disposed in the bottom 5a of the exterior case 5, as illustrated in FIG. 4, the negative electrode lead 16 is arranged so that its one end is in a region enclosed by the thin portion 5b. This end of the negative electrode lead 16 has such a length and a width that the end portion does not interfere with the thin portion 5b, and thus the operation of the thin portion 5b will not be hindered.

To prevent the corrosion of iron to a greater extent, it is preferable that the inner surface of the exterior case 5 be plated with nickel. From the point of view of cost, the thickness of the nickel plating is preferably not more than 2 µm, and more preferably not more than 1 µm on the inner surface of the exterior case 5. The nonaqueous electrolytic solution according to the present disclosure does not cause the corrosion of the exterior case even when at least a portion of the nickel plating on the inner surface has a thickness of 1 µm or less.

Next, the elements constituting the nonaqueous electrolyte secondary battery will be described in detail.

Positive Electrodes

The positive electrode 1 is composed of, for example, a positive electrode current collector such as a metal foil, and a positive electrode active material layer disposed on the positive electrode current collector. For example, the positive electrode current collector is a foil of a metal that is stable at a range of potentials applied to the positive electrode 1, or a film having a skin layer of a metal that is stable at a range of potentials applied to the positive electrode 1. Aluminum (Al) is preferable as the metal that is stable at a range of potentials applied to the positive electrode 1. For example, the positive electrode active material layer includes a positive electrode active material and other components such as a conductive agent and a binder, and is obtained by mixing these components in an appropriate solvent and applying the mixture onto the positive electrode current collector followed by drying and rolling.

The positive electrode active material may be a lithium (Li)-containing transition metal oxide. Some of the transition metal atoms in the transition metal oxide may be replaced by atoms of a dissimilar element. The transition metal element may be at least one selected from the group consisting of scandium (Sc), manganese (Mn), iron (Fe), cobalt (Co), nickel (Ni), copper (Cu) and yttrium (Y). Of these transition metal elements, preferred elements are, for example, manganese, cobalt and nickel. The dissimilar element may be at least one selected from the group consisting of magnesium (Mg), aluminum (Al), lead (Pb), antimony (Sb) and boron (B). Of these dissimilar elements, preferred elements are, for example, magnesium and aluminum.

Specific examples of the positive electrode active materials include lithium-containing transition metal oxides such as $LiCoO_2$, $LiNiO_2$, $LiMn_2O_4$, $LiMnO_2$, $LiNi_{1-y}Co_yO_2$ ($0<y<1$), $LiNi_{1-y-z}Co_yMn_zO_2$ ($0<y+z<1$) and $LiNi_{1-y-z}Co_y Al_zO_2$ ($0<y+z<1$). In particular, $LiNi_{1-y-z}Co_yMn_zO_2$ ($0<y+z<0.5$) and $LiNi_{1-y-z}Co_yAl_zO_2$ ($0<y+z<0.5$) containing nickel in a proportion of not less than 50 mol % relative to all the transition metals are preferable from the points of view of cost and specific capacity. These positive electrode active materials contain a large amount of alkali components and thus accelerate the decomposition of nonaqueous electrolytic solutions to cause a decrease in durability. However, the nonaqueous electrolytic solution of the present disclosure is resistant to decomposition even when used in combination with these positive electrode active materials. The positive electrode active materials may be used singly, or two or more may be used in combination.

The conductive agent serves to increase the electron conductivity of the positive electrode active material layer. Examples of the conductive agents include conductive carbon materials, metal powders and organic materials. Specific examples include such carbon materials as acetylene black, Ketjen black and graphite, such metal powders as aluminum powder, and such organic materials as phenylene derivatives. The conductive agents may be used singly, or two or more may be used in combination.

The binder serves to ensure a good contact between the positive electrode active material and the conductive agent and to increase the adhesion of the components such as the positive electrode active material with respect to the surface of the positive electrode current collector. Examples of the binders include fluoropolymers and rubbery polymers. Specific examples include such fluoropolymers as polytetrafluoroethylene (PTFE), polyvinylidene fluoride (PVdF) and modified products thereof, and such rubbery polymers as ethylene-propylene-isoprene copolymer and ethylene-propylene-butadiene copolymer. The binder may be used in combination with a thickener such as carboxymethylcellulose (CMC) or polyethylene oxide (PEO).

Negative Electrodes

The negative electrode 2 is composed of, for example, a negative electrode current collector such as a metal foil, and a negative electrode active material layer disposed on the negative electrode current collector. For example, the negative electrode current collector is a foil of a metal that is not alloyed with lithium at a range of potentials applied to the negative electrode 2, or a film having a skin layer of a metal that is not alloyed with lithium at a range of potentials applied to the negative electrode 2. Copper is suitable as the metal that is not alloyed with lithium at a range of potentials applied to the negative electrode 2 because this metal is easily processed at low cost and has good electron conductivity. For example, the negative electrode active material layer includes a negative electrode active material and other components such as a binder, and is obtained by mixing these components in water or an appropriate solvent and applying the mixture onto the negative electrode current collector followed by drying and rolling.

The negative electrode active materials are not particularly limited as long as the materials can store and release lithium ions. Examples of the negative electrode active materials include carbon materials, metals, alloys, metal oxides, metal nitrides, and lithium-intercalated carbon and silicon. Examples of the carbon materials include natural graphite, artificial graphite and pitch-based carbon fibers. Specific examples of the metals and the alloys include lithium (Li), silicon (Si), tin (Sn), germanium (Ge), indium (In), gallium (Ga), lithium alloys, silicon alloys and tin alloys. The negative electrode active materials may be used singly, or two or more may be used in combination.

Similarly to the case of the positive electrode 1, the binder may be a fluoropolymer or a rubbery polymer and is preferably a rubbery polymer such as styrene-butadiene copolymer (SBR) or a modified product thereof. The binder may be used in combination with a thickener such as carboxymethylcellulose (CMC) sodium.

For example, the negative electrode current collector is a foil of a metal that is not alloyed with lithium at a range of potentials applied to the negative electrode 2, or a film having a skin layer of a metal that is not alloyed with lithium at a range of potentials applied to the negative electrode 2. Copper is suitable as the metal that is not alloyed with lithium at a range of potentials applied to the negative electrode 2 because this metal is easily processed at low cost and has good electron conductivity.

Separators

The separator 3 may be a porous film having ion permeability and insulating properties and is disposed between the positive electrode 1 and the negative electrode 2. Examples of the porous films include microporous thin films, woven fabrics and nonwoven fabrics. Suitable materials for the separators are polyolefins. More specifically, for example, polyethylene and polypropylene are preferable.

Nonaqueous Electrolytic Solutions

The nonaqueous electrolytic solution includes a nonaqueous solvent, an electrolyte salt dissolved in the nonaqueous solvent, and an additive. The nonaqueous electrolytic solution includes a fluorinated carboxylate ester having an α hydrogen atom as the nonaqueous solvent, and lithium fluorosulfate salt ($LiSO_3F$) as the additive.

Fluorinated chain carboxylate esters are disclosed to react with a negative electrode to be reductively decomposed at about 1.2 V or less versus metallic lithium (see Japanese Unexamined Patent Application Publication No. 2009-289414). To prevent this reductive decomposition from occurring to an excessive degree on the surface of the negative electrode, it is preferable to add a film-forming compound to the nonaqueous solvent which can form a film on the surface of the negative electrode.

The film-forming compound is suitably fluoroethylene carbonate (FEC) which can form an appropriate film on the surface of the negative electrode and also functions effectively as a nonaqueous solvent.

If FEC is added to the nonaqueous solvent in an excessively small amount, the compound fails to form a sufficient film on the surface of the negative electrode and the fluorinated chain carboxylate ester is sometimes decomposed reductively to cause a decrease in high-temperature storage characteristics. If, on the other hand, the amount of FEC is excessively large, the nonaqueous electrolytic solution exhibits so high a viscosity that load characteristics are decreased at times. Thus, it is preferable that the amount of FEC be controlled to the range of 2 vol % to 40 vol %, more preferably 5 vol % to 30 vol % relative to the whole nonaqueous solvent.

As the fluorinated carboxylate ester, methyl 3,3,3-trifluoropropionate (FMP) is preferable because this compound has low viscosity and provides high conductivity. The fluorinated carboxylate ester is preferably present in 50 vol % or more relative to the whole nonaqueous solvent in the nonaqueous electrolytic solution. This amount ensures that the fluorinated carboxylate ester forms an appropriate film on the surface of the negative electrode while serving as a nonaqueous solvent.

When used in combination with the nonaqueous solvent including the fluorinated carboxylate ester, $LiSO_3F$ prevents the reaction of the fluorinated carboxylate ester with an alkali component present in the positive electrode 1 and thereby enhances the initial efficiency while good low-temperature discharge characteristics and high-temperature storage characteristics are ensured. $LiSO_3F$ is preferably added in 0.1 to 3 mass % relative to the total mass of the nonaqueous electrolytic solution. If the amount is below the lower limit of this range, $LiSO_3F$ will fail to prevent sufficiently the decomposition reaction of the fluorinated carboxylate ester. If the amount exceeds the upper limit of the above range, decomposition reaction will occur markedly to cause an increase in internal resistance and the generation of gas at times.

As described above, the addition of $LiSO_3F$ to the nonaqueous solvent including the fluorinated carboxylate ester results in a nonaqueous electrolytic solution which allows a battery to achieve an enhancement in initial efficiency while still exhibiting good low-temperature discharge characteristics and high-temperature storage characteristics by virtue of the action of the fluorinated carboxylate ester.

Further, the combined use of the fluorinated carboxylate ester and $LiSO_3F$ ensures that the resultant nonaqueous electrolytic solution does not cause the corrosion of the exterior case 5 of the battery containing the nonaqueous electrolytic solution. Specifically, the fluorinated carboxylate ester undergoes the decomposition reaction represented by the reaction formula (II) described hereinabove to form a film which serves as a protective layer for the inner surface of the exterior case 5. This protective layer suppresses the reaction between $LiSO_3F$-derived decomposition products and nickel deposited on the inner surface of the exterior case 5. As a result, iron forming the exterior case 5 is not exposed and the corrosion of the case is prevented.

Preferably, the nonaqueous solvent further includes propylene carbonate (PC). Propylene carbonate is easily decomposed on the negative electrode during the first charging and reacts coordinately when the fluorinated carboxylate ester undergoes the decomposition reaction. In this manner, propylene carbonate and the fluorinated carboxylate ester form a dense composite film which attains equal or higher effects compared to the film formed by the decomposition reaction of the fluorinated carboxylate ester alone.

The nonaqueous solvent may include the fluorinated chain carboxylate ester, FEC, PC and further a fluorine-free nonaqueous solvent. Preferred fluorine-free nonaqueous solvents are ethylene carbonate (EC) and ethyl methyl carbonate (EMC). Examples of such solvents further include dimethyl carbonate (DMC), diethyl carbonate (DEC), methyl acetate, methyl propionate and ethyl acetate.

The electrolyte salt may be a lithium salt. Examples of the lithium salts include $LiPF_6$, $LiBF_4$, $LiCF_3SO_3$, $LiClO_4$, $LiN(CF_3SO_2)_2$, $LiN(C_2F_5SO_2)_2$, $LiN(CF_3SO_2)(C_4F_9SO_2)$, $LiC(CF_3SO_2)_3$ and $LiC(C_2F_5SO_2)_3$, with $LiPF_6$, $LiBF_4$ and $LiN(CF_3SO_2)_2$ being particularly preferable.

The nonaqueous electrolytic solution may include an additional additive other than $LiSO_3F$. The additives serve as surface film-forming agents which form an ion permeable film on the surface of the positive electrode 1 or the negative electrode 2 before the decomposition reaction of the nonaqueous solvent and the electrolyte salt occurs on the surface of the positive electrode 1 or the negative electrode 2 and thereby prevent the decomposition reaction of the nonaqueous electrolytic solution on the surface of the positive electrode 1 or the negative electrode 2.

Examples of such additives include vinylene carbonate (VC), ethylene sulfite (ES), lithium bis(oxalato)borate (LiBOB), cyclohexylbenzene (CHB) and ortho-terphenyl (OTP). The additives may be used singly, or two or more may be used in combination. The proportion of the additives in the nonaqueous electrolytic solution is not limited as long as a sufficient film can be formed and is preferably greater than 0 mass % and not more than 3 mass % relative to the total mass of the nonaqueous electrolytic solution.

In particular, vinylene carbonate is easily decomposed on the negative electrode and reacts coordinately when the fluorinated carboxylate ester undergoes the decomposition reaction. In this manner, vinylene carbonate and the fluorinated carboxylate ester advantageously form a dense composite film.

The nonaqueous electrolytic solution of the present disclosure may be applied to a nonaqueous electrolyte secondary battery that is so configured that an electrode assembly 4 in which a positive electrode 1 and a negative electrode 2 are wound or stacked together through a separator 3, and the nonaqueous electrolytic solution are accommodated in an Fe-based exterior case 5 and the negative electrode 2 is electrically connected to the exterior case 5.

Hereinbelow, the present disclosure will be described in greater detail based on examples and comparative examples. However, the scope of the present disclosure is not limited to such examples. In Examples 1 to 5 and Comparative Examples 1 to 8, nonaqueous electrolyte secondary batteries were fabricated in the manner specifically described below.

EXAMPLE 1

Fabrication of Positive Electrode

Lithium-containing transition metal oxide $LiNi_{0.50}Co_{0.20}Mn_{0.30}O_2$ was used as a positive electrode active material. The active material, acetylene black and polyvinylidene fluoride were mixed together in a mass ratio of 96:2:2. An appropriate amount of N-methyl-2-pyrrolidone (NMP) was added to the mixture. A positive electrode mixture slurry was thus prepared. Next, the positive electrode mixture slurry was applied to both sides of an aluminum foil as a positive electrode current collector. The wet films were dried and rolled with a roller. In this manner, a positive electrode 1 was fabricated which had the positive electrode active material layers on both sides of the positive electrode current collector. The packing density of the positive electrode 1 was 3.4 g/cm$^3$.

Fabrication of Negative Electrode

Artificial graphite, carboxymethylcellulose sodium (CMC-Na) and styrene-butadiene copolymer (SBR) were mixed together in a mass ratio of 98:1:1 in an aqueous solution to give a negative electrode mixture slurry. Next, the negative electrode mixture slurry was uniformly applied to both sides of a copper foil as a negative electrode current collector. The wet films were dried and rolled with a roller. In this manner, a negative electrode 2 was fabricated which had the negative electrode mixture layers on both sides of the negative electrode current collector. The packing density of the negative electrode 2 was 1.6 g/cm$^3$.

Preparation of Nonaqueous Electrolytic Solution

Lithium hexaflurophosphate (LiPF$_6$) was dissolved with a concentration of 1.2 mol/L into a mixed solvent including fluoroethylene carbonate (FEC) and methyl 3,3,3-trifluoropropionate (FMP) in a volume ratio of 15:85, thereby preparing a nonaqueous electrolytic solution. Further, LiSO$_3$F was added in an amount of 1 mass % relative to the total amount of the nonaqueous electrolytic solution.

Fabrication of Exterior Case

An exterior case was fabricated in the following manner. First, an iron base plate having a Ni-plated surface was drawn to form a bottomed cylindrical exterior case 5. Next, the exterior case 5 was processed to form a circumferential groove 5c that was U-shaped in cross section and had a width of 1.0 mm and a depth of 1.5 mm near the opening of the cylinder. The plate thickness of the cylindrical portion of the exterior case 5 was 0.25 mm, and the plate thickness of the bottom 5a of the exterior case 5 was 0.3 mm. The diameter of the bottom 5a was 18 mm. SEM observation showed that the thickness of the Ni plating on the inner surface of the bottom 5a of the exterior case 5 was not more than 2 μm.

Fabrication of Battery

The positive electrode 1 and the negative electrode 2 were wound together through a microporous polyethylene film as a separator 3 to form an electrode assembly 4. The nonaqueous electrolytic solution and the electrode assembly 4 were placed into the exterior case 5 while connecting the positive electrode 1 in the electrode assembly 4 to a filter 12 through a positive electrode lead 15 and the negative electrode 2 to the bottom 5a of the exterior case 5 through a negative electrode lead 16. Thereafter, the open end of the exterior case 5 was tightly closed with a sealing member 6 through a gasket 7. In this manner, a 18650 cylindrical nonaqueous electrolyte secondary battery A1 having a designed capacity of 2300 mAh was fabricated.

Initial Efficiency

At an environment temperature of 25° C., the battery was charged at a constant current of 1150 mA [0.5 It] until the battery voltage reached 4.1 V and was further charged at a constant voltage of 4.1 V until the current value reached 46 mA. After a rest of 10 minutes, the battery was discharged at 1150 mA [0.5 It] to a battery voltage of 3.0 V and was allowed to rest for 20 minutes. The initial efficiency was obtained using the following equation:

Initial efficiency=Discharge capacity/Charge capacity×100

Discharge Characteristics at −5° C.

At an environment temperature of 25° C., the battery was charged at a constant current of 1150 mA [0.5 It] until the battery voltage reached 4.1 V and was further charged at a constant voltage of 4.1 V until the current value reached 46 mA. After a rest of 10 minutes, the battery was discharged at 1150 mA [0.5 It] to a battery voltage of 3.0 V and was allowed to rest for 20 minutes. Next, the battery was charged again at a constant current of 1150 mA [0.5 It] until the battery voltage reached 4.1 V and was further charged at a constant voltage of 4.1 V until the current value reached 46 mA. Thereafter, the environment temperature was changed to −5° C., and the battery was discharged at 1150 mA [0.5

It] to a battery voltage of 3.0 V. The retention of discharge capacity at −5° C. was determined according to the following equation:

Retention of discharge capacity at −5° C.=Discharge capacity at −5° C./Discharge capacity at 25° C.×100

High-Temperature Storage Characteristics

At an environment temperature of 45° C., the battery was subjected to 600 cycles of charging and discharging under the same charging and discharging conditions as in the testing of the initial efficiency. The retention of capacity after the 600 cycles was calculated using the following equation. Here, the retention of capacity after the 600 cycles at 45° C. is an index for the evaluation of high-temperature storage characteristics.

Retention of capacity=(Discharge capacity in 600th cycle/Discharge capacity in 1st cycle)×100

High-Temperature Over-Discharging

A ceramic resistor was connected to the positive and negative electrodes of the battery to form an external short-circuit. The battery was then stored in a thermostatic chamber at 60° C., and the appearance of the battery after 10 days was observed.

EXAMPLE 2

A battery A2 was fabricated and was tested to evaluate the initial efficiency, the discharge characteristics at −5° C., the high-temperature storage characteristics and the high-temperature over-discharging characteristics in the same manner as in Example 1, except that vinylene carbonate (VC) was further added to the nonaqueous electrolytic solution in an amount of 1 mass % relative to the total mass of the nonaqueous electrolytic solution.

COMPARATIVE EXAMPLE 1

A battery C1 was fabricated and was tested to evaluate the initial efficiency, the discharge characteristics at −5° C., the high-temperature storage characteristics and the high-temperature over-discharging characteristics in the same manner as in Example 1, except that $LiSO_3F$ was not added.

COMPARATIVE EXAMPLE 2

A battery C2 was fabricated and was tested to evaluate the initial efficiency, the discharge characteristics at −5° C., the high-temperature storage characteristics and the high-temperature over-discharging characteristics in the same manner as in Comparative Example 1, except that vinylene carbonate was added to the nonaqueous electrolytic solution in an amount of 1 mass % relative to the total mass of the nonaqueous electrolytic solution.

EXAMPLE 3

A battery A3 was fabricated and was tested to evaluate the initial efficiency, the discharge characteristics at −5° C., the high-temperature storage characteristics and the high-temperature over-discharging characteristics in the same manner as in Example 2, except that the nonaqueous solvent was changed to a mixed solvent including FEC, PC and FMP in a volume ratio of 15:5:80.

COMPARATIVE EXAMPLE 3

A battery C3 was fabricated and was tested to evaluate the initial efficiency, the discharge characteristics at −5° C., the high-temperature storage characteristics and the high-temperature over-discharging characteristics in the same manner as in Example 3, except that $LiSO_3F$ was not added.

EXAMPLE 4

A battery A4 was fabricated and was tested to evaluate the initial efficiency, the discharge characteristics at −5° C., the high-temperature storage characteristics and the high-temperature over-discharging characteristics in the same manner as in Example 2, except that the nonaqueous solvent was changed to a mixed solvent including FEC, PC, FMP and ethyl methyl carbonate (EMC) in a volume ratio of 15:5:60:20.

COMPARATIVE EXAMPLE 4

A battery C4 was fabricated and was tested to evaluate the initial efficiency, the discharge characteristics at −5° C., the high-temperature storage characteristics and the high-temperature over-discharging characteristics in the same manner as in Example 2, except that the nonaqueous solvent was changed to a mixed solvent including FEC and EMC in a volume ratio of 15:85.

COMPARATIVE EXAMPLE 5

A battery C5 was fabricated and was tested to evaluate the initial efficiency, the discharge characteristics at −5° C., the high-temperature storage characteristics and the high-temperature over-discharging characteristics in the same manner as in Comparative Example 4, except that $LiSO_3F$ was not added.

COMPARATIVE EXAMPLE 6

A battery C6 was fabricated and was tested to evaluate the initial efficiency, the discharge characteristics at −5° C., the high-temperature storage characteristics and the high-temperature over-discharging characteristics in the same manner as in Example 2, except that the nonaqueous solvent was changed to a mixed solvent including ethylene carbonate (EC) and ethyl methyl carbonate (EMC) in a volume ratio of 15:85.

COMPARATIVE EXAMPLE 7

A battery C7 was fabricated and was tested to evaluate the initial efficiency, the discharge characteristics at −5° C., the high-temperature storage characteristics and the high-temperature over-discharging characteristics in the same manner as in Comparative Example 6, except that $LiSO_3F$ was not added.

Table 1 describes the results of the evaluations of the initial efficiency, the discharge characteristics at −5° C., the high-temperature storage characteristics and the high-temperature over-discharging characteristics in Examples 1 to 4 and Comparative Examples 1 to 7.

TABLE 1

|  | Solvent | Additives | Initial efficiency (%) | Discharge characteristics at −5° C. vs. 25° C. (%) | High-temperature storage characteristics during cycles at 45° C. (%) | Appearance after 10 days of over-discharging at high temperature |
|---|---|---|---|---|---|---|
| Ex. 1 | FEC/FMP (15/85) | LiSO$_3$F 1 wt % | 88 | 82 | 88 | No change |
| Ex. 2 |  | VC 1 wt % + LiSO$_3$F 1 wt % | 88 | 82 | 89 | No change |
| Comp. Ex. 1 |  | Not added | 85 | 82 | 89 | No change |
| Comp. Ex. 2 |  | VC 1 wt % | 85 | 83 | 89 | No change |
| Ex. 3 | FEC/PC/FMP (15/5/80) | VC 1 wt % + LiSO$_3$F 1 wt % | 89 | 83 | 88 | No change |
| Comp. Ex. 3 |  | VC 1 wt % | 84 | 83 | 88 | No change |
| Ex. 4 | FEC/PC/FMP/EMC (15/5/60/20) | VC 1 wt % + LiSO$_3$F 1 wt % | 88 | 83 | 88 | No change |
| Comp. Ex. 4 | FEC/EMC (15/85) | VC 1 wt % + LiSO$_3$F 1 wt % | 86 | 81 | 88 | Case corroded |
| Comp. Ex. 5 | FEC/EMC (15/85) | VC 1 wt % | 87 | 79 | 86 | No change |
| Comp. Ex. 6 | EC/EMC (15/85) | VC 1 wt % + LiSO$_3$F 1 wt % | 87 | 79 | 76 | Case corroded |
| Comp. Ex. 7 | EC/EMC (15/85) | VC 1 wt % | 87 | 72 | 70 | No change |

As described in Table 1, the comparison of Examples 1 and 2 to Comparative Examples 1 and 2 which involved the same nonaqueous solvent (FEC/FMP) has confirmed that the addition of LiSO$_3$F improves the initial efficiency as demonstrated in Examples 1 and 2. Further, the comparison of Example 3 to Comparative Example 3 has shown that the initial efficiency was improved in Example 3 and thus has confirmed that the addition of LiSO$_3$F to FEC/PC/FMP as the nonaqueous solvent also improves the initial efficiency. From the comparison of Examples 1 and 2 and Comparative Examples 1 and 2 to Example 3 and Comparative Example 3, the degree of the enhancement in initial efficiency was greater between Example 3 and Comparative Example 3. This result is probably because PC present in the nonaqueous solvent used in Example 3 and Comparative Example 3 reacted coordinately with FEC and FMP to form a dense composite film which contributed to the greater enhancement.

Example 4, which involved EMC in addition to the nonaqueous solvent used in Example 3, resulted in an improvement in initial efficiency similarly to Example 3.

The nonaqueous solvents used in Examples 1 to 4 and Comparative Examples 1 to 3 contained FMP, and consequently the batteries exhibited excellent low-temperature discharge characteristics and high-temperature storage characteristics. In contrast, the absence of FMP in the nonaqueous solvent in Comparative Examples 4 and 5 caused a decrease in low-temperature discharge characteristics. Further, the nonaqueous solvent in Comparative Examples 6 and 7 did not contain FMP and the batteries were poor in both low-temperature discharge characteristics and high-temperature storage characteristics.

The observation of the appearance of the batteries showed that the exterior cases had been corroded in Comparative Examples 4 and 6 in which the nonaqueous electrolytic solution contained LiSO$_3$F but was free from FMP, whilst the appearance of the other batteries was unchanged. These results have confirmed that the addition of FMP prevents the corrosion of the exterior case even in the case where the nonaqueous electrolytic solution contains LiSO$_3$F.

Here, it is preferable that the exterior case 5 have a thin portion 5b in the bottom 5a. However, the formation of such a thin portion 5b in the exterior case 5 tends to cause the thickness of the Ni plating to be reduced. Such thinned Ni plating will be consumed by the reaction of LiSO$_3$F-derived decomposition products with nickel, and consequently iron will be exposed and the exterior case will be corroded. In order to confirm whether the corrosion of the exterior case 5 would be prevented even in the thin portion 5b, batteries of Example 5 and Comparative Example 8 were fabricated and were over-discharged at a high temperature. In the evaluation of the high-temperature over-discharging characteristics, the appearance was observed after 5 days and after 10 days.

Formation of Thin Portion

In the fabrication of batteries of Example 5 and Comparative Example 8, a thin portion 5b having the following dimension was formed in the exterior case 5. As illustrated in FIG. 3, the thin portion 5b was a circular ring with a diameter D of 9 mm that was recessed from the level of the outer bottom surface toward the inner surface of the bottom. The plate thickness of the thin portion 5b was 0.25 mm. SEM observation showed that the thickness of the Ni plating on the inner surface of the thin portion 5b of the exterior case 5 was not more than 1 μm. The proportion of the area of the circular region enclosed by the thin portion 5b was 25% relative to the area of the bottom 5a.

EXAMPLE 5

A battery A5 was fabricated and was tested to evaluate the high-temperature over-discharging characteristics in the same manner as in Example 2, except that a thin portion 5b was formed in the bottom 5a of the exterior case 5.

COMPARATIVE EXAMPLE 8

A battery C8 was fabricated and was tested to evaluate the high-temperature over-discharging characteristics in the same manner as in Comparative Example 4, except that a thin portion 5b was formed in the bottom 5a of the exterior case 5.

Table 2 describes the results of the evaluation after 5 days or 10 days of over-discharging at high temperature in Example 5 and Comparative Example 8 together with the results in Example 2 and Comparative Example 4.

TABLE 2

| | Solvent | Additives | Thin portion in bottom | Appearance after 5 days of over-discharging at high temperature | Appearance after 10 days of over-discharging at high temperature |
|---|---|---|---|---|---|
| Ex. 5 | FEC/FMP (15/85) | VC 1 wt % + LiSO$_3$F 1 wt % | Present | No change | No change |
| Ex. 2 | | | Absent | No change | No change |
| Comp. Ex. 8 | FEC/EMC (15/85) | VC 1 wt % + LiSO$_3$F 1 wt % | Present | Case corroded | Case corroded |
| Comp. Ex. 4 | | | Absent | No change | Case corroded |

In Comparative Example 8, as described in Table 2, the thin portion 5b of the exterior case 5 was found to have been corroded during the 5 days of over-discharging at high temperature. In Comparative Example 4 in which the nonaqueous solvent did not contain FMP and the battery did not have any thin portion 5b, the exterior case was found to have been corroded during the 10 days of over-discharging at high temperature. In contrast, the exterior cases 5 in Examples 2 and 5 in which the nonaqueous solvent contained FMP were free from corrosion regardless of the presence or absence of the thin portion 5b. These results show that even in the case where the nonaqueous electrolytic solution contains LiSO$_3$F, the incorporation of FMP into the nonaqueous solvent prevents the corrosion of the exterior case 5 through the formation of a film on the inner surface of the exterior case 5 as a result of the reaction represented by the reaction formula (II). This film probably serves as a protective layer on the inner surface of the exterior case 5 so as to suppress the reaction between LiSO$_3$F-derived decomposition products and nickel and thereby to prevent the exterior case 5 from being corroded.

According to the embodiment described hereinabove, the nonaqueous electrolytic solution including a fluorinated carboxylate ester and lithium fluorosulfate salt (LiSO$_3$F), and the nonaqueous electrolyte secondary battery including the nonaqueous electrolytic solution achieve excellent low-temperature discharge characteristics and high-temperature storage characteristics and also attain an improvement in initial efficiency.

In a configuration in which the negative electrode 2 is electrically connected to the exterior case 5 and the exterior case 5 contains iron, the nonaqueous electrolyte secondary battery which includes the nonaqueous electrolytic solution containing a fluorinated carboxylate ester and lithium fluorosulfate salt (LiSO$_3$F) is prevented from the corrosion of the exterior case.

The configurations of the nonaqueous electrolytic solutions for nonaqueous electrolyte secondary batteries of the present disclosure are not limited to those described in the above embodiment and, for example, the following configurations are also within the scope of the present disclosure.

Item 1

A nonaqueous electrolytic solution for nonaqueous electrolyte secondary batteries including a nonaqueous solvent and an electrolyte, the nonaqueous solvent including a fluorinated carboxylate ester represented by the formula (1):

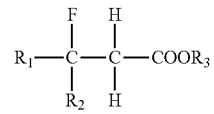

where R$_1$ and R$_2$ are each any of H, F, CH$_{3-x}$F$_x$ (x is 1, 2 or 3) and R$_3$ is an optionally fluorinated alkyl group having 1 to 3 carbon atoms,
the nonaqueous electrolytic solution further including lithium fluorosulfate salt (LiSO$_3$F).

Item 2

The nonaqueous electrolytic solution described in Item 1, further including fluoroethylene carbonate (FEC).

Item 3

The nonaqueous electrolytic solution described in Item 1, further including propylene carbonate (PC).

Item 4

The nonaqueous electrolytic solution described in Item 1 or 2, which contains the LiSO$_3$F in an amount of 0.1 to 3 mass % relative to the total mass of the nonaqueous electrolytic solution.

Item 5

The nonaqueous electrolytic solution described in any one of Items 1 to 3, wherein the fluorinated carboxylate ester is methyl 3,3,3-trifluoropropionate (FMP).

Item 6

The nonaqueous electrolytic solution described in any one of Items 1 to 4, which contains the fluorinated carboxylate ester in an amount of not less than 50 vol % relative to the total volume of the nonaqueous solvent in the nonaqueous electrolytic solution.

Item 7

The nonaqueous electrolytic solution described in any one of Items 1 to 6, further including vinylene carbonate (VC) in an amount of 0.1 to 3 mass % relative to the total mass of the nonaqueous electrolytic solution.

Item 8

A nonaqueous electrolyte secondary battery including an electrode assembly in which a positive electrode and a negative electrode are stacked together through a separator, a nonaqueous electrolytic solution, and an exterior case accommodating the electrode assembly and the nonaqueous electrolytic solution,
the negative electrode being electrically connected to the exterior case,
the exterior case containing iron,
the nonaqueous electrolytic solution including a fluorinated carboxylate ester and lithium fluorosulfate salt (LiSO$_3$F).

Item 9

The nonaqueous electrolyte secondary battery described in Item 8, wherein the exterior case has a thin portion in a bottom.

Item 10

The nonaqueous electrolyte secondary battery described in Item 8 or 9, wherein the exterior case is plated with nickel and the nickel plating has a thickness of not more than 1 μm in at least a portion of an inner surface of the exterior case.

Item 11

The nonaqueous electrolyte secondary battery described in any one of Items 8 to 10, wherein the positive electrode includes a lithium-containing transition metal oxide as a positive electrode active material and the proportion of nickel in the total of the transition metal(s) is not less than 50 mol %.

What is claimed is:

1. A nonaqueous electrolyte secondary battery comprising:
   an electrode assembly in which a positive electrode and a negative electrode are stacked together through a separator;
   a nonaqueous electrolytic solution; and
   an exterior case accommodating the electrode assembly and the nonaqueous electrolytic solution, wherein:
      the negative electrode is electrically connected to the exterior case,
      the exterior case contains iron,
      the nonaqueous electrolytic solution includes a fluorinated carboxylate ester and lithium fluorosulfate salt ($LiSO_3F$),
   the fluorinated carboxylate ester is represented by the following formula:

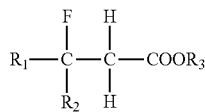

where $R_1$ and $R_2$ are each any of H, F, $CH_{3-x}F_x$ (x is 1, 2 or 3) and $R_3$ is an alkyl group having 1 to 3 carbon atoms or is a fluorinated alkyl group having 1 to 3 carbon atoms, and
   the lithium fluorosulfate salt ($LiSO_3F$) is present in the nonaqueous electrolytic solution in a range from 1 mass % to 3 mass %.

2. The nonaqueous electrolyte secondary battery according to claim 1, wherein a bottom of the exterior case has a thin portion having a thickness smaller than a remaining portion of the bottom.

3. The nonaqueous electrolyte secondary battery according to claim 1, wherein at least a part of an inner surface of the exterior case containing iron is plated with nickel.

4. The nonaqueous electrolyte secondary battery according to claim 1, wherein the positive electrode includes a lithium-containing transition metal oxide as a positive electrode active material and the proportion of nickel in the total of the transition metal is not less than 50 mol % and equal to or smaller than 100 mol %.

5. The nonaqueous electrolyte secondary battery according to claim 1, wherein the nonaqueous electrolytic solution further includes fluoroethylene carbonate (FEC).

6. The nonaqueous electrolyte secondary battery according to claim 1, wherein the nonaqueous electrolytic solution further includes propylene carbonate (PC).

7. The nonaqueous electrolyte secondary battery according to claim 1, wherein the fluorinated carboxylate ester is methyl 3,3,3-trifluoropropionate (FMP).

8. The nonaqueous electrolyte secondary battery according to claim 1, wherein the nonaqueous electrolytic solution contains the fluorinated carboxylate ester in an amount of not less than 50 vol % and not greater than 85 vol % relative to the total volume of the nonaqueous solvent in the nonaqueous electrolytic solution.

9. The nonaqueous electrolyte secondary battery according to claim 1, wherein the nonaqueous electrolytic solution further includes vinylene carbonate (VC) in an amount of 0.1 to 3 mass % relative to the total mass of the nonaqueous electrolytic solution.

* * * * *